US008699580B2

(12) United States Patent
Bjontegaard

(10) Patent No.: US 8,699,580 B2
(45) Date of Patent: Apr. 15, 2014

(54) METHOD, APPARATUS, AND COMPUTER READABLE MEDIUM FOR VIDEO COMPRESSION

(75) Inventor: Gisle Bjontegaard, Oppengard (NO)

(73) Assignee: Cisco Technology, Inc., San Jose, CA (US)

( * ) Notice: Subject to any disclaimer, the term of this patent is extended or adjusted under 35 U.S.C. 154(b) by 832 days.

(21) Appl. No.: 12/900,886

(22) Filed: Oct. 8, 2010

(65) Prior Publication Data

US 2011/0110433 A1 May 12, 2011

Related U.S. Application Data

(60) Provisional application No. 61/250,111, filed on Oct. 9, 2009.

(30) Foreign Application Priority Data

Oct. 16, 2009 (NO) .................................. 20093155

(51) Int. Cl.
H04N 7/12 (2006.01)
H04N 11/02 (2006.01)
H04N 11/04 (2006.01)

(52) U.S. Cl.
USPC ............ 375/240.24; 375/240.03; 375/240.18; 382/248; 382/251; 348/387.1; 348/390.1

(58) Field of Classification Search
USPC .......... 375/240.01–240.29; 348/385.1–440.1; 382/233–253
See application file for complete search history.

(56) References Cited

U.S. PATENT DOCUMENTS

| 5,021,891 | A | 6/1991 | Lee |
| 2009/0122864 | A1 | 5/2009 | Palfner et al. |
| 2009/0196517 | A1 | 8/2009 | Divorra Escoda et al. |
| 2011/0090967 | A1* | 4/2011 | Chen et al. ............... 375/240.16 |
| 2012/0307896 | A1 | 12/2012 | Palfner et al. |

FOREIGN PATENT DOCUMENTS

| EP | 1 956 847 A1 | 8/2008 |
| JP | 2004-253826 | 9/2004 |
| WO | WO 03/075579 A2 | 9/2003 |
| WO | WO 03/075579 A3 | 9/2003 |
| WO | WO 2008/027192 A2 | 3/2008 |

OTHER PUBLICATIONS

The Extended European Search Report issued May 15, 2013, in Application no. / Patent No. 10823661.3-1908 / 2489194 PCT/NO2010000361.
S. Naito, et al., "Efficient coding scheme for super high definition video based on extending H.264 high profile", Proceedings of Spie, SPIE—International Society for Optical Engineering, vol. 6077, No. 67727, XP-002538136, Jan. 18, 2006, pp. 1-8.

(Continued)

Primary Examiner — Sath V Perungavoor
Assistant Examiner — Nathnael Aynalem
(74) Attorney, Agent, or Firm — Oblon, Spivak, McClelland, Maier & Neustadt, L.L.P.

(57) ABSTRACT

A method for scanning MacroBlocks in video compression and selecting alternative sized Large Macroblocks accordingly. The scanning pattern is divided into scanning fragments with a size corresponding to different possible Large Macroblocks. This allows for varying the size of the selected Macroblocks, based on minimizing distortion and/or bit rate consumption.

12 Claims, 3 Drawing Sheets

(56) References Cited

OTHER PUBLICATIONS

Hans Georg Musmann, et al., "Coding Algorithms and VLSI Implementations for Digital TV and HDTV Satellite Broadcasting", European Transactions on Telecommunications and Related Technologies, vol. 4, No. 1, XP000358885, Jan. 1, 1993, pp. 11-21.

Alan Quayle, et al., "A Method for Compatible Coding of HDTV and TV", British Telecommunications Engineering, vol. 12, No. Part 02, XP000383364, Jul. 1, 1993, pp. 146-153.

Guido M. Schuster, et al., "An Optimal Quadtree-Based Motion Estimation and Motion-Compensated Interpolation Scheme for Video Compression", IEEE Transactions on Image Processing, vol. 7, No. 11, XP000783123, Nov. 1, 1998, pp. 1505-1523.

Peter Borgwardt, "Rectangular Slices to Tradeoff Error Resiliency and Coding Efficiency", Joint Video Team (JVT) of ISO/IEC MPEG & ITU-T VCEG (ISO/IEC JTC1/SC29/WG11 and ITU-T SG16 Q.6) (JVT-0048r1), (VideoTele.com), ITU Study Group 16, Video Coding Experts Group, XP030005157, May 10, 2002, 6 pages.

"Recommendation H.263" Video coding for low bit rate communication, ITU-T Recommendation H.263, XP002588432, Feb. 1, 1998, pp. 85-88.

Norwegian Search Report dated May 12, 2010 in Norwegian Application 20093155.

\* cited by examiner

METHOD, APPARATUS, AND COMPUTER READABLE MEDIUM FOR VIDEO COMPRESSION

CROSS REFERENCE TO RELATED APPLICATION

The present application claims the benefit of Provisional Application Ser. No. 61/250,111, filed Oct. 9, 2009, and claims the benefit of priority under 35 U.S.C. 119 from Norwegian Application No. 20093155, filed on Oct. 16, 2009, the entire contents of both of which are hereby incorporated herein by reference.

TECHNOLOGICAL FIELD

The exemplary embodiments described herein relate to the field of digital video compression, and more specifically variable Macroblock sizes and the scanning order of MacroBlocks.

BACKGROUND

Transmission of moving pictures in real-time is employed in several applications such as video conferencing, net meetings, TV broadcasting and video telephony.

However, representing moving pictures requires bulk information as digital video typically is described by representing each pixel in a picture with 8 bits (1 Byte). Such uncompressed video data results in large bit volumes, and cannot be transferred over conventional communication networks and transmission lines in real time due to limited bandwidth.

Thus, enabling real time video transmission requires a large extent of data compression. Data compression may, however, compromise the picture quality. Therefore, great efforts have been made to develop compression techniques allowing real time transmission of high quality video over bandwidth limited data connections.

Many video compression standards have been developed over the last 20 years. Many of those methods are standardized through ISO (the International Standards organization) or ITU (the International Telecommunications Union). In addition, a number of other proprietary methods have been developed. The main standardized methods are:
ITU: H.261, H.262, H.263, H.264
ISO: MPEG1, MPEG2, MPEG4/AVC)

In video compression systems, the main goal is to represent the video information with as little capacity as possible. Capacity is defined with bits, either as a constant value or as bits/time unit. In both cases, the main goal is to reduce the number of bits.

The first step in the coding process according to these standards is to divide the picture into square blocks of pixels, for instance 16×16. These blocks are typically denoted as Macroblocks (MB). This is done for luminance information as well as for chrominance information. A scanning order of the MBs is established. A scanning order defines the encoding/decoding order of the MBs in a picture. A raster scan is typically used. This means that MBs are scanned as MB-lines from left to right and then the MB-lines from top to bottom. A raster scan order is illustrated in FIG. 1.

The following prediction process significantly reduces the amount of bits required for each picture in a video sequence to be transferred. It takes advantage of the similarity of parts of the sequence with other parts of the sequence, and produces a prediction for the pixels in the block. This may be based on pixels in an already coded/decoded picture (called inter prediction) or on already coded/decoded pixels in the same picture (intra prediction).

The prediction is mainly based on vectors representing movements. In a typical video sequence, the content of a present block M would be similar to a corresponding block in a previously decoded picture. If no changes have occurred since the previously decoded picture, the content of M would be equal to a block of the same location in the previously decoded picture. In other cases, an object in the picture may have been moved so that the content of M is more equal to a block of a different location in the previously decoded picture. Such movements are represented by motion vectors (V). As an example, a motion vector of (3;4) means that the content of M has moved 3 pixels to the left and 4 pixels upwards since the previously decoded picture. For improved accuracy, the vector may also include decimals, requiring interpolation between the pixels. Since the predictor part is known to both encoder and decoder, only the difference has to be transferred. This difference typically requires much less capacity for its representation. The difference between the pixels to be coded and the predicted pixels is often referred to as a residual.

The residual represented as a block of data (e.g. 4×3 pixels) still contains internal correlation. A well-known method of taking advantage of this is to perform a two dimensional block transform. In H.263 an 8×8 Discrete Cosine Transform (DCT) is used, whereas H.264 uses a N×N (where N can be 4 or 8) integer type transform. This transforms N×N pixels into N×N transform coefficients and they can usually be represented by fewer bits than the pixel representation. Transform of a N×N array of pixels with internal correlation will probably result in a 4×3 block of transform coefficients with much fewer non-zero values than the original 4×3 pixel block.

Direct representation of the transform coefficients is still too costly for many applications. A quantization process is carried out for a further reduction of the data representation. Hence the transform coefficients undergo quantization. A simple version of quantisation is to divide parameter values by a number—resulting in a smaller number that may be represented by fewer bits. This is the major tool for controlling the bit production and reconstructed picture quality. It should be mentioned that this quantization process has as a result that the reconstructed video sequence is somewhat different from the uncompressed sequence. This phenomenon is referred to as "lossy coding". This means that the reconstructed pictures typically have lower quality than the original pictures. The output from the quantization process is integer numbers—which do not represent the original transform coefficients correctly. These integers together with integers representing the side information is coded in a lossless way and transmitted to the decoder.

Finally, a scanning within the MBs of the two dimensional transform coefficient data into a one dimensional set of data is performed, and the one dimensional set is further transformed according to an entropy coding scheme. Entropy coding implies lossless representation of the quantized transform coefficients. In depicting the transform coefficients it is common to position the low frequency coefficient (or DC coefficient) in the upper left corner. Then the horizontal and vertical spatial frequency increase to the right and down. The scanning usually starts with the coefficient in the left upper corner and follows a zig-zag pattern around the diagonal direction towards the lower right corner of the MB, but in other cases the entropy coding may be more efficient if "inverse scanning" (high to low frequency) is used.

The above steps are listed in a natural order for the encoder. The decoder will to some extent perform the operations in the opposite order and do "inverse" operations as inverse transform instead of transform and de-quantization instead of quantization.

In connection with the introduction of video formats of higher resolution in video conferencing, an increasing number of pixels will represent a picture of the same physical segment. Hence, an image section will contain an increasing number of 16×16 MB. The probability of many adjacent MBs having the same characteristics, e.g. motion vectors and zero-transforms, is therefore increasing, and consequently also redundant data representation.

SUMMARY OF THE INVENTION

An exemplary embodiment described herein provides a method of video coding, including the steps of: arranging the residual pixels into p×p sized MacroBlocks (MB), (k*p)×(l*p) sized first LargeMacroBlocks (LMB), and/or (m*p)×(n*p) sized second LargeMacroBlocks (LMB) determined by a predefined criterion for minimizing bit rate consumption and/or distortion, wherein p indicates the spatial size of an MB, k, l, m and n are integer numbers, m is divisible by k and n is divisible by l; scanning MBs in a first zig-zag scanning pattern within first rectangular picture fragments corresponding to the size of the first LMB or the second LMB; and indicating occurrences of MBs, first LMBs and/or second LMBs by a block type code arranged in an order of which the MBs, first LMBs and/or second LMBs are scanned.

A corresponding inverse method for decoding is also described herein.

Furthermore, the present specification describes exemplary embodiments of an encoding apparatus, a decoding apparatus, and a computer readable storage medium.

BRIEF DESCRIPTION OF THE DRAWINGS

In order to make the invention more readily understandable, the discussion that follows will refer to the accompanying drawings.

DETAILED DESCRIPTION OF THE PRESENT INVENTION

Figure 1:
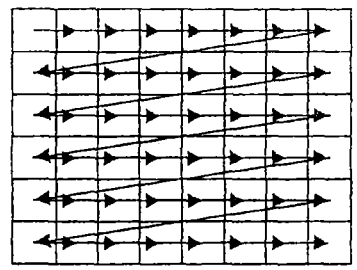
FIG. 1 indicates the scanning pattern of Macro Blocks according to in a conventional way of video coding.

Exemplary embodiments described herein provide a scanning order and a scanning scheme of MBs which is adjusted for coding of pictures of high resolution. Scanning in this context means the order of which the MBs within a video picture are coded or decoded. Raster scan is the conventional way of scanning MBs in video coding. As can be seen from FIG. 1, this means that MBs are scanned as MB-lines from left to right and then the MB-lines from top to bottom.

Figure 2:
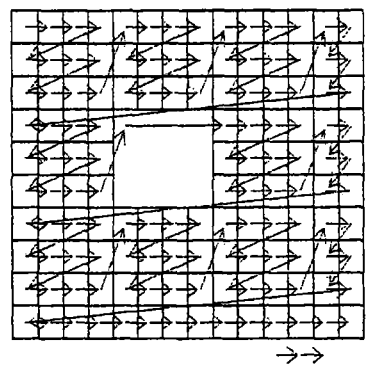
FIG. 2 shows an example of a scanning pattern of Macro Blocks according to a first embodiment.

FIG. 2 illustrates an example of an alternative scanning pattern according to a first embodiment of the present invention. The scan starts with the upper left MB and proceeds horizontally towards the right. However, the scan does not proceed all the way to the end of the row. After the fourth MB in the upper line, the scan turns down to the leftmost MB in the row of MBs below, and proceeds towards the right. This is repeated in a zig-zag pattern within a 4×3 dimension rectangle of MB blocks. Such rectangles of MB blocks in which a zig-zag scanning pattern appears, may also be denoted as scanning fragments. After finishing the scan of these MBs, the scanning is preformed equivalently on the right hand adjacent 4×3 dimension rectangle of MB blocks. When reaching the right picture border, the scanning proceeds to the leftmost 4×3 dimension rectangle of MB blocks below the already scanned blocks.

At the right or bottom edge of the picture, there may not be room for a full 4×3 fragment. In this case, the size of the fragments covering the remaining picture is adjusted accordingly as indicated in FIG. 2.

Figure 3:
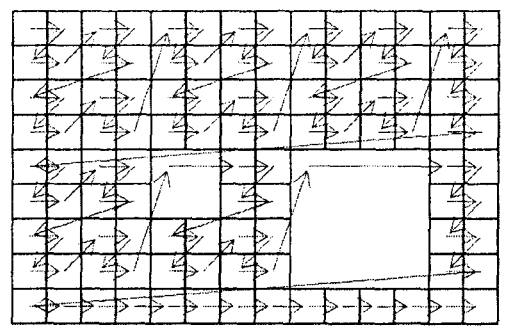
FIG. 3 shows an example of a scanning pattern of Macro Blocks according to a second embodiment.

The scanning pattern according to the above description allows for the introduction of larger blocks of alternative sizes. For the scanning pattern in the example described above, a Large Macro Block (LMB) with the size corresponding to the size of 4×3 regular MBs can be inserted in the picture without compromising with the overall scanning pattern. The gaps (white rectangles) in FIGS. 2 and 3 show occurrences of LMBs among MBs. The LMBs can be positioned as a replacement of 4×3 MBs in what otherwise would have been a 4×3 dimension scanning fragment as described above. In the case of each MB having a size of 16×16 pixels, the LMB would then have a size of 64×48 pixels. Smaller LMBs must be used at the right and bottom edge according to the size of the above-mentioned fragments covering the remaining picture is adjusted accordingly as indicated in FIG. 2.

The dimensions in the description of the first embodiment are of course only examples. A variety of other dimensions of MBs and LMBs are conceivable, but the size of the LMBs must correspond to the size of an integer number MBs, the scanning pattern and hence the size of the scanning fragment. Consequently, other scanning patterns could be used. Generally, an LMB can have the size of (m*p)×(n*p) pixels, n and m being integer numbers, and p the pixel dimension of an MB.

FIG. 3 illustrates an example of an alternative scanning pattern according to a second embodiment of the present invention. The scan starts with the upper left MB and proceeds towards the right. However, when reaching the second MB in the upper row, the scan turns down to the leftmost MB in the row of MBs below, and proceeds towards the right to the second MB in the second row of MBs. As can be seen in FIG. 3, at this point, a zig-zag scan has been performed within a small fragment of 2×2 MBs. The scan then jumps up to the third MB in the upper row and performs a corresponding zig-zag scan within the next small fragment of 2×2 MBs on the right hand side. After scanning these two small fragments the scanning jumps down to the leftmost MB on the third row, and perform a corresponding scanning on the two small fragments just below, ending in the fourth MB in the fourth row. As can be seen, a group of blocks corresponding to the 4×4 scanning fragment as described in the first embodiment has been scanned, but in a different scanning pattern forming four small scanning patterns each containing 2×2 MBs.

The second embodiment of the invention allows consequently for two alternative LMBs, one small LMB corresponding to the size of the small fragment (2×2 MBs), and another large LMB corresponding to a large fragment (4×4 MBs). In the case of each MB having a size of 16×16 pixels, the small LMB would then have a size of 32×32 pixels.

The dimensions in the description of the second embodiment above are of course only examples. A variety of other dimensions of MBs and small and large LMBs are conceivable, but the size of the LMBs must correspond to the size of an integer number MBs, the scanning pattern and hence the size of the scanning fragments. The size of a large LMB must also correspond to the size of an integer number small LMBs. Consequently, other scanning patterns could be used. Generally, a large LMB can have the size of (m*p)×(n*p) pixels, n and m being integer numbers, and p the pixel dimension of an MB. A small LMB can have the size of (k*p)×(l*p) pixels, k and l being integer numbers. The fact that the size of a large LMB must also correspond to the size of an integer number small LMBs implies further that m is divisible by k, and n is divisible by l. In the example above, k=2, l=2, m=4, n=4 and p=16.

There is no limitation of the number of LMBs of different sizes, even if there are only two given in the description above. In the embodiments described above, there are as many scanning fragment levels as there are LMB variants, and the scanning fragments have the same size as the respective LMB variants. A scanning fragment of a lower level must further have a known scanning pattern within the next scanning fragment level, and the dimensions of a scanning fragment must be divisible by the dimensions of the a lower level scanning fragment. For example, in the case of the second embodiment described above, there is a first scanning fragment level of 2×2 MBs, and a second scanning fragment level of 4×4 MBs. The scanning fragment level of 4×4 MBs is of a higher level than the scanning fragment level of 2×2 MBs, which has a scanning pattern within the fragment level of 4×4 MBs, and the dimensions are divisible by each other. There could also accordingly be a third and a fourth scanning fragment following the same logic.

There are many ways of deciding if coding shall be based on 16×16 MBs or a LMB of some size. One frequently used method is to make the decision based on a Rate_Distortion measure. The Rate Distortion (RD) measure over a block is typically:

$$\text{Rate\_Distortion} = \text{Distortion} + \text{Rate}$$
$$= D + R$$
$$= \text{sum (pixel\_errors}^2) + f(\text{bits\_to\_code\_the\_block}).$$

Distortion (D) is most often calculated as the square_sum (indicated by pixel_errors$^2$) of the reconstructed pixel errors. Rate (R) depends on the number of bits used to code the block.

Moreover, the reason that there are reconstructed pixel errors is that transform coefficients are not represented exactly but have been quantized. The quantization interval may be defined by q. A small q results in a small D, and a large number of bits. On the other hand, a large q results in a large D and a small number of bits. From this the function f( ) is of the form:

f(bits_to_code_the_block)=k*q*bits_to_code_the_block, where k is a constant not very different from 1. For the pixel area of a size corresponding to a LMB, RD$_{LMB}$ and RD$_{MB}$ are calculated. If RD$_{MB}$<RD$_{LMB}$ the coding is based on 16×16 MBs. Otherwise, the coding is based on LMB. Similarly, if there are more block sizes (more LMB sizes) the RD values are calculated and compared to arrive at the overall solution with the lowest Rate_Distortion measure (RD)."

The description above is for a full RD decision. This is one of many methods. In some situations the described procedure may be found too implementation costly. In such cases the distortion as described above may be replaced by some other measure of distortion—either of the reconstructed pixels or prediction errors. The last may typically come from motion estimation where a Sum of Absolute Differences (SAD) between pixels to be coded and already decoded pixels are calculated. Such a distortion measure alone or together with a number of bits used for coding may be used instead of a full RD measure as described above. The decision may also be based on minimizing the number of bits used (bit rate consumption) only. However, the decision methods are all referred to as rate distortion measure in this application.

Occurrences of MBs and different types of LMBs are signalled in a block type code as bits in the bit stream between encoder and decoder. The combination of the order of the bit codes sent, the actual scanning order and the run code will uniquely indicate positions of MBs and different LMBs. Run coding is explained further below. Normally, coding will have a result that for most of the MBs there is no need to send any information. This is mainly because there has been no change in the MB since the last picture. An MB that does not need to transmit any information is often called a skipped block. The decoder will already know how to reconstruct the pixels in a skipped or "not coded" MB. For other MBs there will be bits transmitted in order to reconstruct the pixels on the decoder. Such a MB is referred to as "coded".

This is a situation where "run coding" is used in many areas. Instead of indicating whether each MB is "coded" or "not coded", it is more efficient to use a code only for the "coded" MBs. This code contains information of how many "not coded" MBs there were since the last "coded" MB. Hence the "run" from the last coded MB is coded. In combination with the block type code indicating MB or a LMB variant, the further scan pattern will be given, and the run code will have that pattern as an assumption. Introducing LMBs provides the possibility of performing a transform operation on larger pixel areas when appropriate for example by transforming all the pixels of one luminance/chrominance component in an LMB with a size and dimension of the transform matrix corresponding to the size and dimension of the LMB. Likewise, a common motion vector or set of motion vectors can represent larger pixel areas, i.e. a whole LMB. The transform operation and motion vector estimate is preferably performed according to the standards, but then on a block size larger than conventionally.

All the transform coefficients resulting in the LMB transform may be quantized and entropy coded, but more realistically, a subset of for instance the 8×8 lowest frequency coefficients could be used. In this case, a method of quantizing and coding 8×8 transform coefficients otherwise used for 8×8 block transform can be reused.

The above description is directed to encoding, but the corresponding applies also for decoding, but in an inverse manner.

A decoder will receive the indications of MB and LMB in a separate code arranged in the order of which they occur in the scanning pattern logics used at the encoder side. The actual positions and occurrences of MBs and LMBs in the picture can then be derived from the run code which states the run (distance) between non-skipped blocks, the block type indications, the received order of which, and the zig-zag scanning pattern which in turn is given from the block type indications in combination with knowing the scanning pattern logics on the encoder side.

Figure 4:
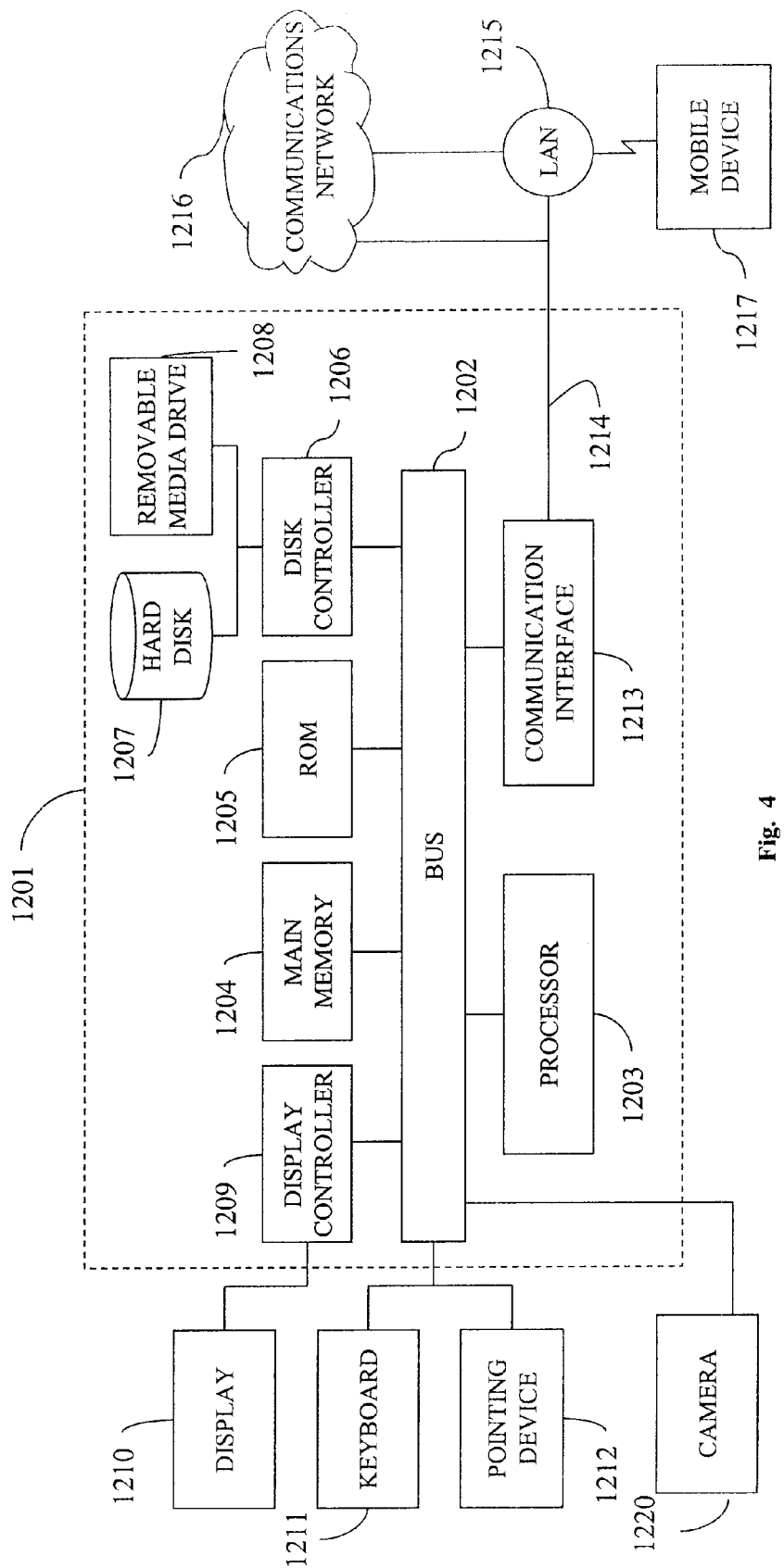
FIG. 4 shows an example of a computer system that is programmed as an encoder/decoder.

FIG. 4 illustrates an example of video conferencing encoder/decoder apparatus that is configured to implement the encoding and/or decoding embodiments described supra. The algorithms described supra may be written in computer executable instructions, which may be executed by the machine shown in FIG. 4. The encoder/decoder apparatus may be embodied in a video conference endpoint or may be a stand alone device.

The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, for displaying information and/or video to a user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the exemplary embodiments discussed supra in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204.

The computer system 1201 includes at least one computer readable storage medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable storage media, the exemplary embodiments include software for controlling the computer system 1201, for driving a device or devices for implementing the invention, and for enabling the computer system 1201 to interact with a human user (e.g., video conference participant). Such software may include, but is not limited to, device drivers, operating systems, development tools, and applications software. Such computer readable media further includes the computer readable storage medium of the present invention for performing all or a portion (if processing is distributed) of the processing performed in implementing the invention.

The computer code devices may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The present invention is useful especially with large picture formats and result in both lower bit usage and better decoding fidelity than conventional methods using MB size of 16×16 pixels only.

Numerous modifications and variations of the present invention are possible in light of the above teachings. It is therefore to be understood that within the scope of the appended claims, the invention may be practiced otherwise than as specifically described herein.

The invention claimed is:

1. A method of video coding executed by an encoder apparatus, the method comprising:
   arranging, at the encoder apparatus, a residual pixels into blocks sized as at least one of p×p sized MacroBlocks (MBs), (k*p)×(l*p) sized first LargeMacroBlocks (LMBs), and (m*p)×(n*p) sized second LargeMacroBlocks (LMBs) determined by a predefined criterion for minimizing bit rate consumption or distortion, wherein p indicates a spatial size of an MB, k, l, m and n are integer numbers, m is divisible by k and n is divisible by l;
   scanning, at the encoder apparatus, the blocks in a zig-zag scanning pattern within first rectangular picture fragments having a size corresponding to the size of the first LMBs or the second LMBs, the zig-zag pattern being determined based on the size of the first rectangular picture fragments; and
   indicating, at the encoder apparatus, occurrences of MBs, first LMBs and/or second LMBs by a block type code arranged in an order of which the MBs, first LMBs or second LMBs are scanned.

2. The method according to claim 1, wherein when the first rectangular picture fragments correspond to the size of the first LMBs, then a scanning order of the first rectangular picture fragments corresponds to a first zig-zag scanning pattern within second rectangular picture fragments corresponding to the size of the second LMBs.

3. The method according to claim 1, further comprising:
   determining whether coding is based on the MBs, the first LMBs, or the second LMBs based on rate distortion, wherein the rate distortion is defined by a sum of distortion and rate; and
   calculating the rate distortion as a square sum of reconstructed pixel errors, and a rate express number of bits used to code a block.

4. The method according to claim 1, further comprising:
   transforming a first LMB by one (k*p)×(l*p) transform matrix resulting in a corresponding first LMB of transform coefficients; and
   transforming a second LMB by one (m*p)×(n*p) transform matrix resulting in a corresponding second LMB of transform coefficients.

5. The method according to claim 1, wherein the first or second LMBs are represented by one set of motion vectors.

6. The method according to claim 1, further comprising:
   quantizing only i×i upper left transform coefficients of an LMB of transform coefficients; and
   setting not-quantized transform coefficients of the LMB of transform coefficients to zero.

7. The method according to claim 2, further comprising:
   starting the first zig-zag scanning pattern in a first rectangular picture fragment in an upper left corner of one certain second rectangular picture fragment and ending in a first rectangular picture fragment in a lowest right corner of the one certain second rectangular picture fragment.

8. The method according to claim 1,
   wherein when the first rectangular picture fragments correspond to the size of the second LMBs, starting a first zig-zag pattern in a leftmost and first block in an upper and first row of blocks in a rectangular picture fragment, heading horizontally towards the right along the upper and first row of blocks to an m'th block of the upper and first row of blocks, turning to a leftmost and first block in a second row of blocks proceeding to the m'th block of the second row of blocks, and continuing accordingly until the m'th block in the m'th row of blocks is reached.

9. The method according to claim 1,
   wherein when the first rectangular picture fragments correspond to the size of the first LMBs, a first zig-zag pattern starts in a leftmost and first block in an upper and first row of blocks in a rectangular picture fragment, heading horizontally towards the right along the upper and first row of blocks to a k'th block of the upper and first row of blocks, turning to a leftmost and first block in a second row of blocks proceeding to the k'th block of the second row of blocks, and continuing accordingly until the k'th block in the l'th row of blocks is reached.

10. The method according to claim 1, wherein p equals 16, m and n equals 4, and k and l equals 2.

11. A method of video decoding, executed by a decoding apparatus, for transforming transform coefficients to residual pixels in a coded video picture, the method comprising:
    decoding, at the decoding apparatus, a run code resulting in non-skipped block runs
    decoding, at the decoding apparatus, a block type code resulting in block type indications of p×p sized MacroBlocks (MBs), (k*p)×(l*p) sized first LargeMacroBlocks (LMBs), or (m*p)×(n*p) sized second LargeMacroBlocks (LMBs) of transform coefficients, wherein p indicates the spatial size of an MB, k, l, m and n are integer numbers, m is divisible by k and n is divisible by l;
    deriving, at the decoding apparatus, a zig-zag scanning pattern within first rectangular picture fragments having a size corresponding to the size of the first LMBs or the second LMBs, the zig-zag pattern being determined based on the size of the first rectangular picture fragments; and
    determining, at the decoding apparatus, occurrences and positions of the MBs, the first LMBs or the second LMBs in the coded video picture from the block type indications.

12. The method according to claim 11, further comprising:
    transforming an MB by a p×p transform matrix resulting in a corresponding MB of residual pixels;
    transforming a first LMB by a (k*p)×(l*p) transform matrix resulting in a corresponding first LMB of residual pixels; and
    transforming a second LMB by a (m*p)×(n*p) transform matrix resulting in a corresponding second LMB of residual pixels.

\* \* \* \* \*